United States Patent
Moor

(10) Patent No.: US 8,350,220 B2
(45) Date of Patent: Jan. 8, 2013

(54) ENHANCED PET SCANNER DETECTOR MODULE

(75) Inventor: Andrew P. Moor, Knoxville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 775 days.

(21) Appl. No.: 12/566,999

(22) Filed: Sep. 25, 2009

(65) Prior Publication Data

US 2010/0078566 A1  Apr. 1, 2010

Related U.S. Application Data

(60) Provisional application No. 61/100,335, filed on Sep. 26, 2008.

(51) Int. Cl.
*G01T 1/164* (2006.01)

(52) U.S. Cl. .................................. 250/363.03

(58) Field of Classification Search ............ 250/363.03
See application file for complete search history.

(56) References Cited

U.S. PATENT DOCUMENTS

| | | | |
|---|---|---|---|
| 4,818,994 A * | 4/1989 | Orth et al. | 340/870.21 |
| 7,312,438 B2 * | 12/2007 | Ishitsu et al. | 250/252.1 |
| 2005/0129295 A1 * | 6/2005 | Shanmugam et al. | 382/131 |
| 2008/0008401 A1 * | 1/2008 | Zhu et al. | 382/294 |
| 2008/0075342 A1 * | 3/2008 | Lazuka et al. | 382/131 |
| 2008/0298541 A1 * | 12/2008 | Mattson et al. | 378/19 |

* cited by examiner

*Primary Examiner* — David Porta
*Assistant Examiner* — Mindy Vu
(74) *Attorney, Agent, or Firm* — Peter Kendall

(57) ABSTRACT

A programmable memory is provided in each of a plurality of detector modules arrayed in a positron emission tomography (PET) scanner. Each detector module memory stores data associated with its respective detector module. Each memory may be coupled to a processor via a transmission bus. A display device may be coupled to the processor for displaying information relating to information obtained from the detector module memories.

17 Claims, 4 Drawing Sheets

ENHANCED PET SCANNER DETECTOR MODULE

RELATED APPLICATIONS

Priority is claimed under 35 U.S.C. §119(e) from provisional application Ser. No. 61/100,335, filed Sep. 26, 2008.

BACKGROUND

The present disclosure relates to Positron Emission Tomography (PET) data acquisition, more particularly to accessing information associated with detector detectors installed in a PET scanner.

Nuclear medicine is a unique medical specialty wherein radiation is used to acquire images which show the function and anatomy of organs, bones or tissues of the body. Radiopharmaceuticals are introduced into the body, either by injection or ingestion, and are attracted to specific organs, bones or tissues of interest. Such radiopharmaceuticals produce gamma photon emissions which emanate from the body and are captured by a scintillation crystal, with which the photons interact to produce flashes of light or "events." Events are detected by an array of photodetectors, such as photomultiplier tubes, and their spatial locations or positions are calculated and stored. In this way, an image of the organ or tissue under study is created from detection of the distribution of the radioisotopes in the body.

One particular nuclear medicine imaging technique is known as Positron Emission Tomography, or PET. PET is used to produce images for diagnosing the biochemistry or physiology of a specific organ, tumor or other metabolically active site. Measurement of the tissue concentration of a positron emitting radionuclide is based on coincidence detection of the two gamma photons arising from positron annihilation. When a positron is annihilated by an electron, two 511 keV gamma photons are simultaneously produced and travel in approximately opposite directions. Gamma photons produced by an annihilation event can be detected by a pair of oppositely disposed radiation detectors capable of producing a signal in response to the interaction of the gamma photons with a scintillation crystal. Annihilation events are typically identified by a time coincidence between the detection of the two 511 keV gamma photons in the two oppositely disposed detectors, i.e., the gamma photon emissions are detected virtually simultaneously by each detector. When two oppositely disposed gamma photons each strike an oppositely disposed detector to produce a time coincidence event, they also identify a line of response, or LOR, along which the annihilation event has occurred.

Radiation detectors typically are deployed in an array of axially aligned rings, each ring comprising a plurality of individual detectors. For example, scanner detector modules may contain three or four rings of forty eight detectors in each ring. PET scanner manufacturers are mandated by regulatory agencies to maintain a device history record for each scanner, which include, for example, part numbers and serial numbers of all traceable components, including detectors. The specific installation location, ring and angular position, are also to be kept in the record.

The device history record normally is maintained by hand inspection or by use of bar code readers. Application of such process for tracking the large number of individual detectors is time consuming and prone to human errors. For example, if the detector manufacturer discovers a problem with a specific batch of detectors at any time, the locations of the problem detectors in a particular scanner, as well as all other scanners at dispersed geographical sites, must be identified. If a detector problem is found during the testing process upon installation in a particular scanner, this abnormality should be recorded. Should a particular system determine that a detector is experiencing performance problems, the particular details of the problem, and conditions under which it was observed, should be included in a history record for review when field service personnel retrieves the affected detector and returns it to the manufacturer for post-failure analysis.

Detector identification is also needed for scanners that may need to permit or restrict certain functionality based on the model number and/or serial number of the detectors installed in the scanners. For example, a system containing lower-grade detectors might be restricted to certain lower-grade image processing algorithms or algorithms that were tailored to a specific model of detector.

The need thus exists for an easier and more efficient way to track important information associated with individual PET scan detectors and to readily obtain such information at a later date.

DISCLOSURE

The above needs are met, at least in part, by providing a programmable memory for each of a plurality of detector modules arrayed in a positron emission tomography (PET) scanner. The detector modules may be structured in one or more ring configurations. Each detector module includes a plurality of crystal scintillators and photodetectors. Each detector module memory stores data associated with its respective detector module. Each memory may be coupled to a processor via a transmission bus. A display device may be coupled to the processor for displaying information relating to information obtained from the detector module memories. The processor may be coupled to a network accessible by a remote service computer. The detector module memories thus may be accessed pursuant a local or remote request for stored information. Information retrieved may be used for local or remote display.

Each memory may store information that identifies the location of its respective detector module in the array, as well as information that may be defined by a set of attributes common to the plurality of detector modules. For example, the attributes may include module identifier, e.g., serial number, model descriptor, date of manufacture of the detector module, date of testing of the detector module, or other customized criteria. A graphic representation of the array of the plurality of detector modules can be displayed on the local, and/or remote, display device. A detector module of interest to a user may be selected from the graphic representation. In response, the processor can access the associated detector module memory, retrieve information stored therein, and present the retrieved information on the display device. A user may query the detector module memories by selecting a criterion for one attribute of the set of attributes. From information retrieved from the detector module memories, the processor can identify all detectors that meet the selected criterion and control the display device to indicate on the graphic representation those detector modules that have been identified.

Additional advantages of the present disclosure will become readily apparent to those skilled in this art from the following detailed description, wherein only preferred embodiments are shown and described, simply by way of illustration of the best mode contemplated. As will be realized, the disclosure is capable of other and different embodiments, and its several details are capable of modifications in various obvious respects, all without departing from the disclosed concepts. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawing and in which like reference numerals refer to similar elements and in which.

DETAILED DESCRIPTION

Figure 1:
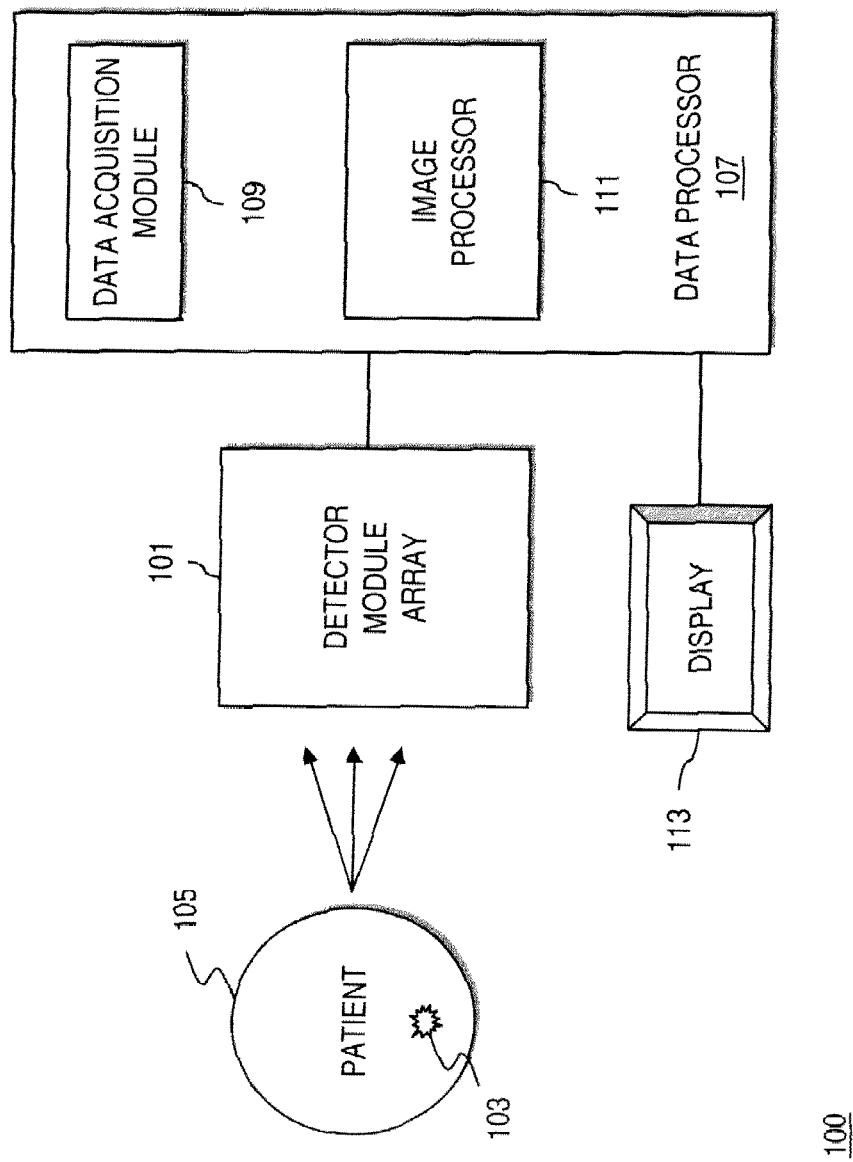
FIG. 1 is an simplified block diagram of a PET detection apparatus.

FIG. 1 is a simplified block diagram of a detection system utilizing a PET scanner for generating depth-of-interaction information. Detection system 100 includes a detector module array 101 to observe events stemming from a radiation source 103 emitting radiation (e.g., gamma rays) from a subject patient 105. The detector module array 101 outputs data to a data processor 107, which includes a data acquisition module 109 and an image processor 111. The data acquisition module 109 uses spatial coordinate signals to produce input to the image processor 111. The image processor 111 can then produce, for example, an image of tissues in the patient 105. The image can then be displayed on a display unit 113.

The detector array may include, for example, detectors used in the Siemens Biograph mCT system. The scanner, for example, may be provided with three rings having 144 detector modules or four rings of 192 detector modules. Event detection data may be output to the data processor 107 in a data stream over a fiber optic line, or equivalent means of transmission. The data acquisition module 109 and image processor 111 may contain local Redundant Array of Independent Disks (RAID) and a direct memory access (DMA) rebinner card such as a Petlink™ DMA rebinner (PDR) made by Siemens. Data processor 107 sums the counted events in data acquisition module 109 and, in conjunction with image processor 111, the data processor 107 reconstructs and displays a two dimensional image of the relative spatial count density on display monitor 113.

Figure 2:
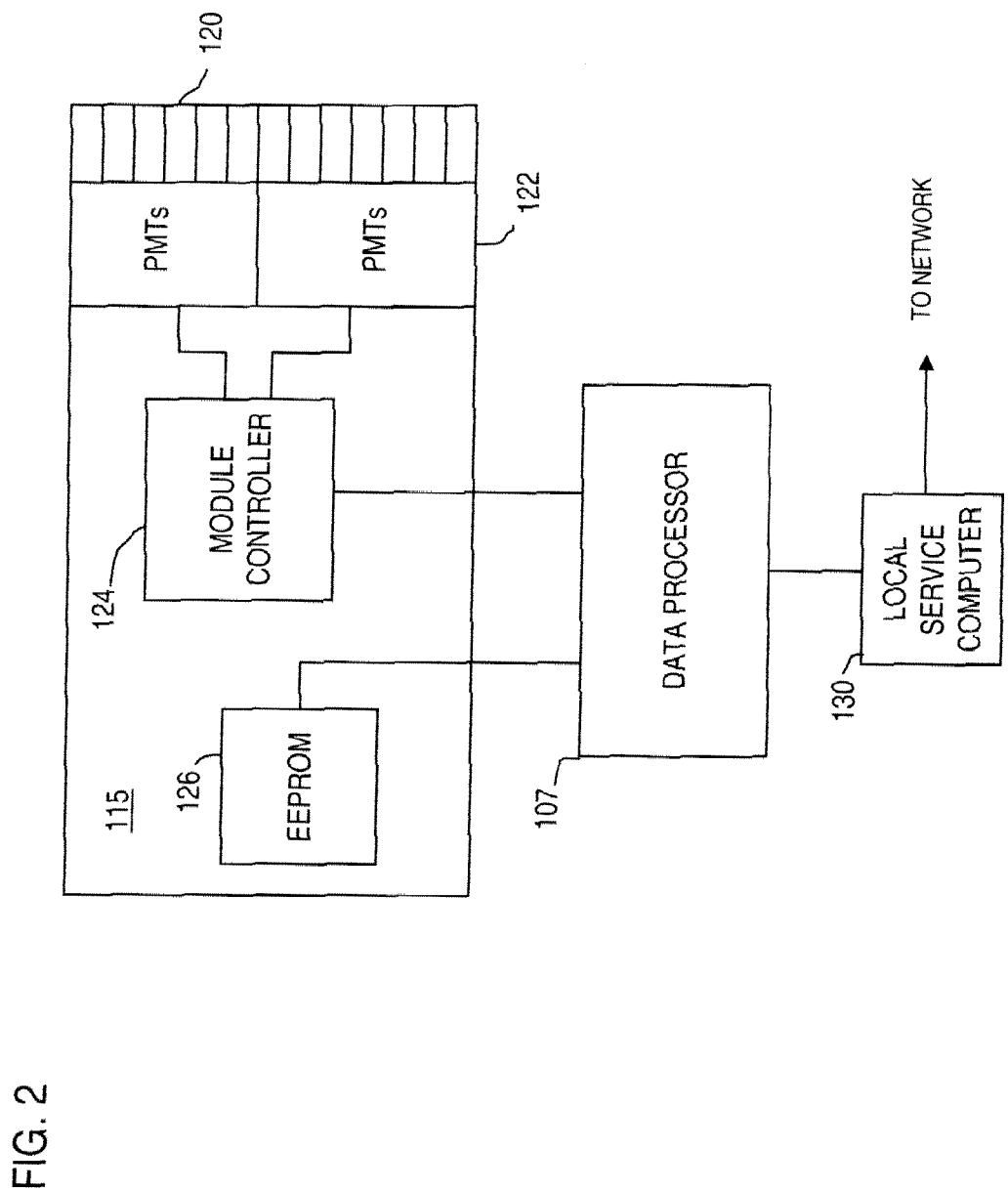
FIG. 2 is a block diagram of a system for maintaining and accessing detector module information.

A detector 115 of the detector module array 101 is represented in the block diagram of FIG. 2. Scintillator crystals 120 receive gamma photon radiation from the subject patient and produce flashes of light, i.e., events, that are detected by photomultiplier tubes (PMTs) 122 or photo detector devices. The PMTs convert the received light to electrical signals, which are amplified and output under control of module controller 124 to data processor 107. Module 124 may comprise front-end electronics for tube biasing, gain control and other such functionality.

Memory 126, illustrated merely by example as an EEPROM, is accessible by I²C protocol bus or the like by data processor 107, which can be coupled to a local service computer 130. Local service computer may be coupled via Ethernet LAN, Internet or other wide area network (WAN) to a remote service computer. Information stored in the memory may include part number, serial number, date of manufacture, date of test, and additional notes as required. Memory 126 is programmed by the detector manufacturer as one of the final steps in the factory test process. When detectors are mounted on the actual system, their serial numbers are already programmed and ready to be queried to generate the Device History Record. This information remains stored in the detector module memory until retrieved by field service personnel.

The memory can be assessed by a software query at any time via the serial bus. All detector modules in the scanner apparatus can be queried simultaneously.

Figure 3:
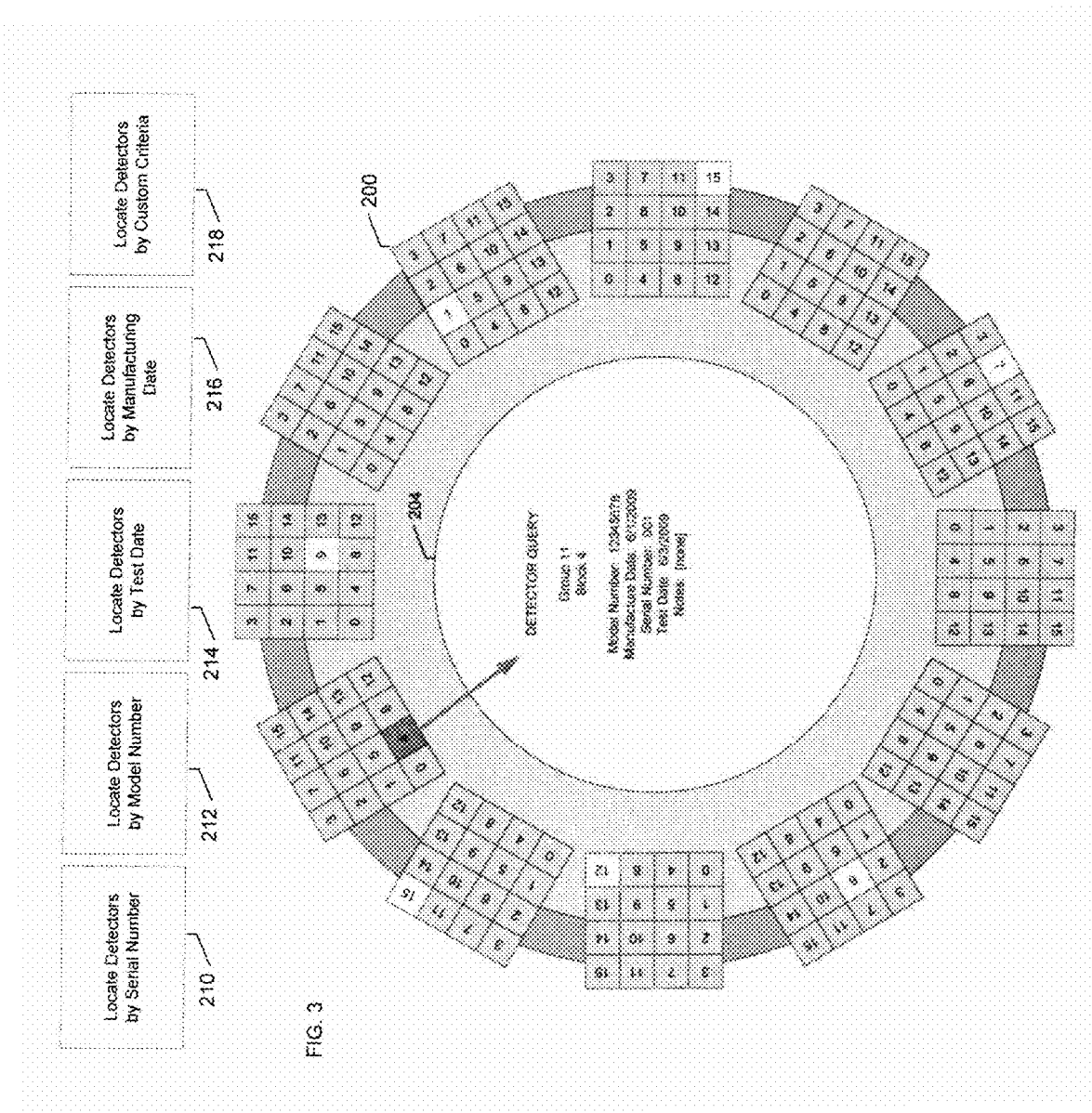
FIG. 3 is an exemplary display representation for a graphical user interface in the system of FIG. 2.

FIG. 3 is an exemplary display representation for a graphical user interface for accessing information from the detector module memories. Data processor 107 may be accessed by local service computer 130 and/or a remote service computer via a network to display the representation shown by example in FIG. 3. The displayed image corresponds to four rings of detector modules. Each ring comprises forty eight detector modules. The displayed image depicts twelve groups 200, each group consisting of four detector modules of each ring that are in radial proximity. The sixteen detector modules of each group are shown as blocks labeled 0-15. The blocks are correlated to the actual location in the array in which the corresponding detector modules are positioned. The center area 204 of the displayed image can be used for displaying results from queries to the stored detector module memories.

A sample table of detector output data for group 0 is shown below. Each group contains a similar output data structure.

| Electronics Group 0 | Model Number | Manufacture Date | Serial Number | Test Date |
| --- | --- | --- | --- | --- |
| Detector 0 | 12345678 | Jun. 1, 2009 | 001 | Jun. 3, 2009 |
| Detector 1 | 12345678 | Jun. 1, 2009 | 002 | Jun. 3, 2009 |
| Detector 2 | 12345678 | Jun. 1, 2009 | 003 | Jun. 3, 2009 |
| Detector 3 | 12345678 | Jun. 1, 2009 | 004 | Jun. 3, 2009 |
| Detector 4 | 12345678 | Jun. 1, 2009 | 005 | Jun. 3, 2009 |
| Detector 5 | 12345678 | Jun. 1, 2009 | 006 | Jun. 3, 2009 |
| Detector 6 | 12345678 | Jun. 1, 2009 | 007 | Jun. 3, 2009 |
| Detector 7 | 12345678 | Jun. 1, 2009 | 008 | Jun. 3, 2009 |
| Detector 8 | 12345678 | Jun. 1, 2009 | 009 | Jun. 3, 2009 |
| Detector 9 | 12345678 | Jun. 1, 2009 | 010 | Jun. 3, 2009 |
| Detector 10 | 12345678 | Jun. 1, 2009 | 011 | Jun. 3, 2009 |
| Detector 11 | 12345678 | Jun. 1, 2009 | 012 | Jun. 3, 2009 |
| Detector 12 | 12345678 | Jun. 1, 2009 | 013 | Jun. 3, 2009 |
| Detector 13 | 12345678 | Jun. 1, 2009 | 014 | Jun. 3, 2009 |
| Detector 14 | 12345678 | Jun. 1, 2009 | 015 | Jun. 3, 2009 |
| Detector 15 | 12345678 | Jun. 1, 2009 | 016 | Jun. 3, 2009 |

Icon buttons 210-218 may be selected by the user to specify a query that accesses all detector modules in the scanner. Selection of button icon 210 will request identification of any detector module having a specified serial number. Selection of button icon 212 will request identification of all detector modules having a specified model number. Selection of button icon 214 will request identification of all detector modules tested on a specified date. Selection of button icon will request identification of all detector modules having a specified date of manufacture. The requests of button icons 210-216 described herein are illustrative. The memories may be programmed to include additional information related to the respective detector modules which may of interest or required by service personnel. Button icon 218 represents the option to identify detectors by custom criteria.

The detector modules that are identified in response to the selection of button icons 210-218 are shown by highlighting their respective blocks in the display. For example, the user may select icon button 212, requesting the locations of all detector modules having a specified model number. FIG. 3 shows highlights of the detector blocks that meet the request.

Detector 9 is highlighted in a group that corresponds for illustrative purposes to be group 0. Assuming that the groups are numbered sequentially in the clockwise direction, the other detectors that meet the requested criterion are detector 1 of group 2, detector 15 of group 3, detector 7 of group 5, detector 8 of group 8, detector 12 of group 9, and detector 15 of group 10. The highlighted blocks correspond to the detector module locations in the array.

The displayed graphical representation of FIG. 3 may also be used to obtain information about a detector module that corresponds to a selected block. For example the user may select block 4 of group 11, as indicated by the shading in the figure. The memory of the detector module that corresponds to block 4 is accessed and the data stored therein is read out for display, as shown in the center area 204.

Figure 4:
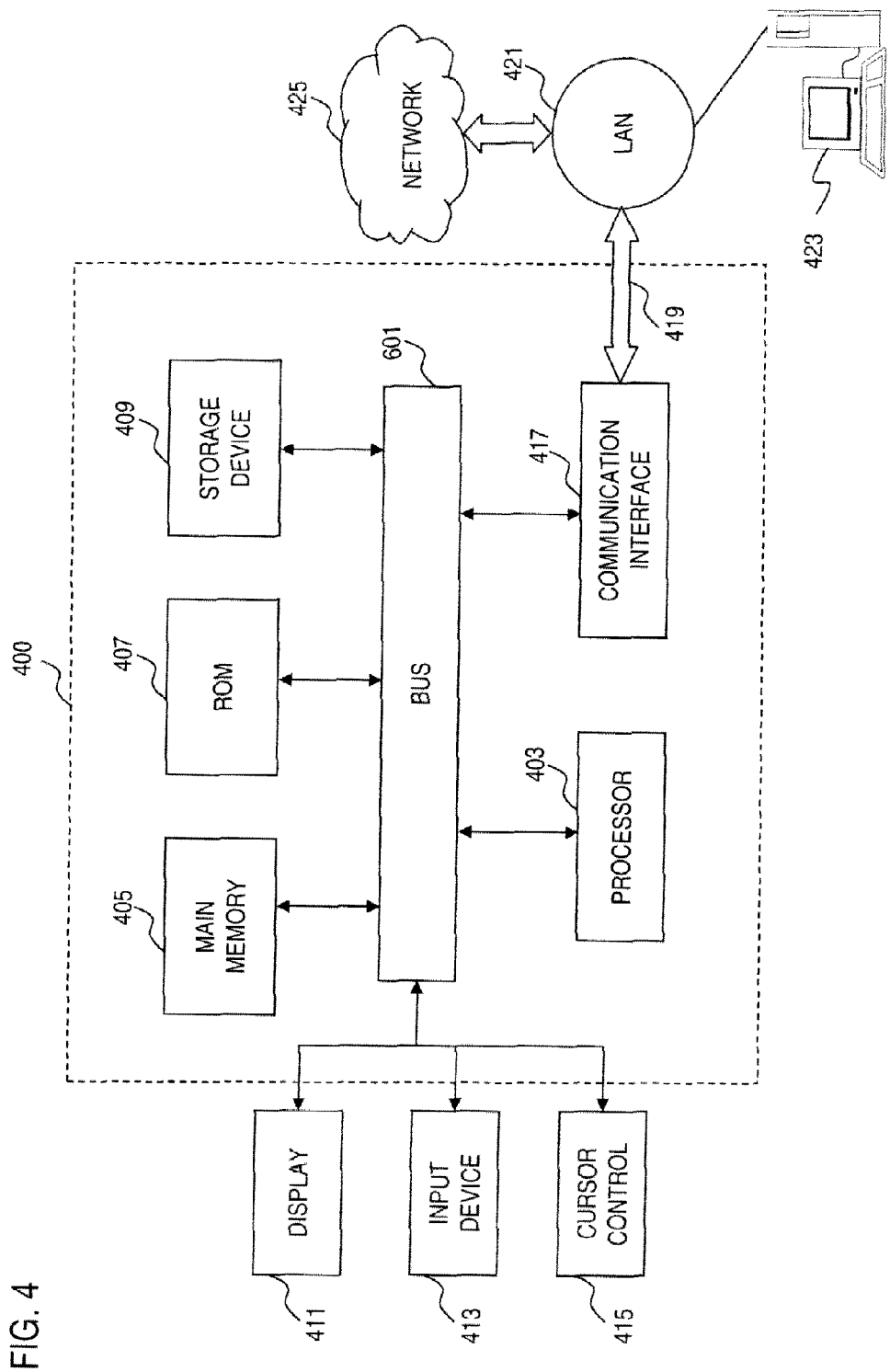
FIG. 4 is a diagram of a computing hardware that can be used to implement various embodiments of the invention.

FIG. 4 illustrates a computing hardware 400 upon which the service computer system can be implemented. The computer system 400 includes a bus 401 or other communication mechanism for communicating information and a processor 403 coupled to the bus 401 for processing information. The computer system 400 also includes main memory 405, such as a random access memory (RAM) or other dynamic storage device, coupled to the bus 401 for storing information and instructions to be executed by the processor 403. Main memory 405 can also be used for storing temporary variables or other intermediate information during execution of instructions by the processor 403. The computer system 400 may further include a read only memory (ROM) 407 or other static storage device coupled to the bus 401 for storing static information and instructions for the processor 403. A storage device 409, such as a magnetic disk or optical disk, is coupled to the bus 401 for persistently storing information and instructions.

The computer system 400 may be coupled via the bus 401 to a display 411, such as a cathode ray tube (CRT), liquid crystal display, active matrix display, or plasma display, for displaying information to a computer user. An input device 413, such as a keyboard including alphanumeric and other keys, is coupled to the bus 401 for communicating information and command selections to the processor 403. Another type of user input device is a cursor control 415, such as a mouse, a trackball, or cursor direction keys, for communicating direction information and command selections to the processor 403 and for controlling cursor movement on the display 411.

Processes are performed by the computer system 400, in response to the processor 403 executing an arrangement of instructions contained in main memory 405. Such instructions can be read into main memory 405 from another computer-readable medium, such as the storage device 409. One or more processors in a multi-processing arrangement may also be employed to execute the instructions contained in main memory 405. In alternative embodiments, hard-wired circuitry may be used in place of or in combination with software instructions to implement the certain embodiments. Thus, the exemplary embodiments are not limited to any specific combination of hardware circuitry and software.

The computer system 400 also includes a communication interface 417 coupled to bus 401. The communication interface 417 provides a two-way data communication coupling to a network link 419 connected to a local network 421. For example, the communication interface 417 may be a digital subscriber line (DSL) card or modem, an integrated services digital network (ISDN) card, a cable modem, a telephone modem, or any other communication interface to provide a data communication connection to a corresponding type of communication line. Communication interface 417 may be a local area network (LAN) card (e.g. for Ethernet™ or an Asynchronous Transfer Model (ATM) network) to provide a data communication connection to a compatible LAN. Wireless links can also be implemented. In any such implementation, communication interface 417 sends and receives electrical, electromagnetic, or optical signals that carry digital data streams representing various types of information. The communication interface 417 can include peripheral interface devices, such as a Universal Serial Bus (USB) interface, a PCMCIA (Personal Computer Memory Card International Association) interface, etc. Although a single communication interface 417 is depicted in FIG. 4, multiple communication interfaces can also be employed.

The network link 419 typically provides data communication through one or more networks to other data devices. For example, the network link 419 may provide a connection through local network 421 to a host computer 423, which has connectivity to a network 425 (e.g. a wide area network (WAN) or the global packet data communication network now commonly referred to as the "Internet") or to data equipment operated by a service provider. The local network 421 and the network 425 both use electrical, electromagnetic, or optical signals to convey information and instructions. The signals through the various networks and the signals on the network link 419 and through the communication interface 417, which communicate digital data with the computer system 400, are exemplary forms of carrier waves bearing the information and instructions.

In this disclosure there are shown and described only preferred embodiments of the invention and but a few examples of its versatility. The system allows a push-button creation of as-installed map of detectors on each scanner, with all part numbers, serial numbers, etc. The information stays in the detector module memories. Technicians can immediately and accurately determine exactly which detectors are installed in a given system, and even where they are installed within the system, by issuing a simple console command, either locally or remotely. Electronic traceability of each detector ensures accurate correlation of detector performance versus intrinsic characteristics and manufacturing processes. If certain batches of detectors must be recalled or serviced, the electronic traceability allows real-time reporting of an affected scanner and detector locations.

It is to be understood that the invention is capable of use in various other combinations and environments and is capable of changes or modifications within the scope of the inventive concept as expressed herein. For example, certain scanner features can be enabled or disabled based on the model or serial number of detectors installed. The locations of the installed detectors associated with the model or serial number of interest can readily be determined.

What is claimed is:

1. A method comprising:
    installing a plurality of detector modules in a positron emission tomography (PET) scanner;
    storing information associated with each of the plurality of detector modules in its respective detector module; and
    accessing the stored information
    wherein the step of accessing further comprises:
    displaying a graphic representation of the array of the plurality of detector modules;
    receiving stored information from the detector modules in response to the query; and
    displaying a result obtained from the received stored information.

2. The method of claim 1, wherein the step of accessing comprises querying the plurality of detector modules.

3. The method of claim 2, wherein the step of querying comprises sending an information request from a remote location.

4. The method of claim 2, wherein the step of installing comprises positioning the plurality of detector modules in a set array, and the stored information comprises the respective location of each detector module in the array.

5. The method of claim 1, wherein the step of accessing further comprises: selecting a detector module of interest from the displayed graphic representation, and the displayed result comprises information related to the selected detector module.

6. The method of claim 1, wherein the step of storing comprises:
defining a common set of information attributes associated with the plurality of detector modules.

7. The method of claim 6, wherein the step of accessing further comprises:
selecting a criterion for one attribute of the set of attributes; and
receiving information identifying all detector modules that meet the selected criterion;
wherein the displayed result comprises a graphical indication of the identified detector modules on the displayed array representation.

8. The method of claim 7, wherein the set of attributes comprises detector module identifier.

9. The method of claim 7, wherein the set of attributes comprises detector module model identifier.

10. The method of claim 7, wherein the set of attributes comprises detector module manufacturing date.

11. The method of claim 7, wherein the step of installing comprises testing the plurality of detector modules, and the set of attributes comprises detector module test date.

12. A system comprising:
a plurality of detector modules arrayed in a positron emission tomography (PET) scanner, each detector module comprising crystal scintillators and photodetectors and a programmable memory;
a processor coupled via a bus to the programmable memory of each detector module; and
a display device coupled to the processor;
wherein each detector module memory is configured to store data information associated with its respective detector module,
wherein the detector modules are arrayed in a plurality of rings, and the stored data comprises information relating to the respective location of each detector module in the array,
wherein the display device is responsive to the data processor to display a graphic representation of the array of the plurality of detector modules, and
wherein the memory is configured to store data in accordance with a common set of information attributes for the plurality of detector modules, and the processor is responsive to selection by a user of a criterion for one of the attributes to access the memory to retrieve data identifying all detector modules that meet the selected criterion.

13. The system of claim 12, wherein the processor is configured to enable or disable features, algorithms, or processes of the scanner based upon a model number, serial number, or other information stored in the detectors installed on the system.

14. The system of claim 12, wherein the processor is responsive to selection by a user of a detector module of interest from the displayed graphic representation to retrieve information with respect to the selected detector module for display at the display device.

15. The system of claim 12, wherein the display device is responsive to the processor to graphically indicate the identified detector modules on the displayed array representation.

16. The system of claim 12, wherein the processor is coupled to a network accessible by a remote service computer, whereby the remote service computer can access information stored in the detector module memories.

17. The system of claim 16, wherein the processor is responsive to a query transmitted by the remote service computer to access the detector module memories and transmit accessed data for display at the remote service computer.

* * * * *